United States Patent [19]

Lack

[11] Patent Number: 4,583,413

[45] Date of Patent: Apr. 22, 1986

[54] TOOTHED GEAR SYSTEM

[75] Inventor: Geoffrey J. Lack, Pershore, United Kingdom

[73] Assignee: Northern Engineering Industries PLC, New Castle upon Tyne, England

[21] Appl. No.: 583,620

[22] Filed: Feb. 27, 1984

[30] Foreign Application Priority Data

Mar. 1, 1983 [GB] United Kingdom ............... 8305587

[51] Int. Cl.$^4$ .............................................. F16H 57/04
[52] U.S. Cl. ....................................... 74/410; 74/467; 74/801
[58] Field of Search .................. 74/410, 411, 409, 467, 74/801

[56] References Cited

U.S. PATENT DOCUMENTS

| | | | |
|---|---|---|---|
| 2,591,734 | 4/1952 | Smith et al. | 74/411 X |
| 2,700,311 | 1/1955 | Bade | 74/410 X |
| 2,703,021 | 3/1955 | Stoeckicht | 74/411 X |
| 2,936,655 | 5/1960 | Peterson et al. | 74/410 X |
| 3,011,365 | 12/1961 | Stoeckicht | 74/410 X |
| 3,424,035 | 1/1969 | Heidrich | 74/410 X |
| 3,686,968 | 8/1972 | Ehrlenspiel et al. | 74/410 |

FOREIGN PATENT DOCUMENTS

| | | | |
|---|---|---|---|
| 210229 | 12/1959 | Fed. Rep. of Germany | 74/410 |
| 972429 | 10/1964 | United Kingdom | 74/411 |

Primary Examiner—William F. Pate, III
Assistant Examiner—Dwight G. Diehl
Attorney, Agent, or Firm—Yuter, Rosen & Dainow

[57] ABSTRACT

A gear system has two ring gears engaging a coupling member directly instead of through an intermediate coupling ring. For example, the ring gears are mounted adjacent to one another on a common axis and have respective helical running teeth which engage oppositely-handed arrays of helical teeth on planet gear wheels which, in turn, mesh with a sun gear wheel. The ring gears also have arrays of external spur coupling teeth offset towards one another from the centers of the running teeth, respectively. The arrays of external teeth mesh with internal spur coupling teeth on the annular coupling member. The ring gears have mutually opposed lubricated abutment surfaces whereby respective transverse forces arising effectively at the centers of the running teeth and acting parallel to the common axis are countered by oppositely acting respective reactions exerted by the ring gears mutually one upon the other. At least one channel for lubricant interconnects the interior of the ring gears with the exterior of the ring gears.

7 Claims, 4 Drawing Figures

TOOTHED GEAR SYSTEM

BACKGROUND TO THE INVENTION

The invention relates to toothed gear systems.

In one well-known form of system, double helical gearing is used in which gear wheels each have two oppositely-handed arrays of external helical teeth which mesh with internal oppositely-handed helical running teeth of two concentric ring gears. The ring gears have external helical coupling teeth by which they are connected to a common coupling member having internal oppositely-handed helical coupling teeth. The common coupling member has external spur coupling teeth by which it is connected to an outer coupling member which has internal spur coupling teeth.

Misalignment between the axis of rotation of the outer coupling member and the common axis of rotation of the ring gears and the inner coupling member is accommodated by relative longitudinal sliding between the spur coupling teeth.

SUMMARY OF THE INVENTION

The object of the invention is to eliminate the inner coupling member.

A toothed gear system, according to the invention, comprises:

(a) gear wheels each having two oppositely-handed arrays of external helical teeth;

(b) two ring gears of equal diameter mounted adjacent to one another on a common axis; and (c) an annular coupling member which is concentric with said ring gears and which has internal spur coupling teeth;

(d) each said ring gear having an array of internal helical running teeth which meshes with a respective one of said arrays of teeth on said gear wheels and having an array of external spur coupling teeth which meshes with said coupling teeth of said member, said array of coupling teeth being offset from the centres of said running teeth of said ring gear towards said array of coupling teeth on said other ring gear; and (e) said ring gears having mutually opposed lubricated abutment surface means whereby respective transverse forces arising effectively at said centres and acting parallel to said common axis are countered by oppositely acting respective reactions exerted by said ring gears mutually one upon the other.

BRIEF DESCRIPTION OF THE DRAWINGS

A toothed gear system will now be described by way of example to illustrate the invention with reference to the accompanying drawings, in which.

DESCRIPTION OF THE PREFERRED EMBODIMENTS

Figure 1:
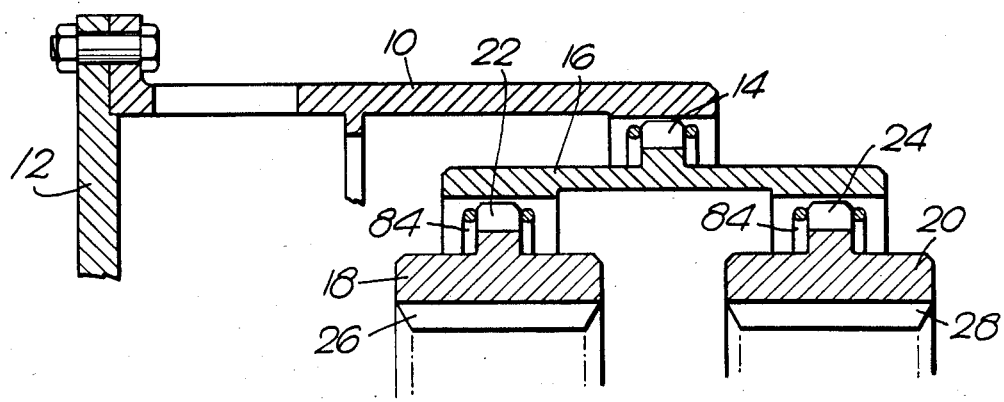
FIG. 1 is a schematic longitudinal section through part of an epicyclic toothed gear system of known type.
Figure 2:
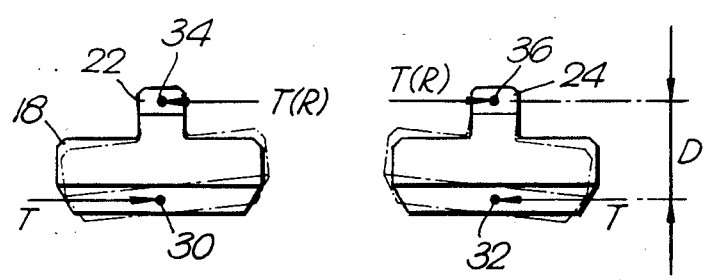
FIG. 2 is a schematic scrap sectional view showing the consequence of the Inside Out effect arising in the system shown in FIG. 1.

FIGS. 1 and 2 show part of a well-known Allen-Stoeckicht epicyclic toothed gear system. The system comprises coupling ring 10 which, for example in a star-type gear system, is connected via the component 12 to a low speed shaft (not shown) of the system. The ring 10 has internal spur coupling teeth (not shown) which engage external spur coupling teeth 14 on an inner coupling ring 16. The ring 16 has two arrays of internal oppositely-handed helical coupling teeth (not shown) adjacent its ends.

The system also comprises two similar ring gears 18, 20 mounted adjacent one another on a common axis and having oppositely-handed, external, helical coupling teeth 22, 24, respectively, engaging the coupling teeth of the ring 16.

The ring gears 18, 20 have respective arrays of internal helical running teeth 26, 28 the arrays being oppositely handed. Planet gear wheels (not shown) (often referred to as star gear wheels in star type gear systems) each having two arrays of oppositely-handed helical running teeth are mounted in bearings on a carrier (not shown) within the ring gears 18, 20 and their arrays of teeth mesh with the respective arrays of teeth of the ring gears 18, 20.

A sun gear wheel (not shown) meshes with the planet gear wheels, in well-known manner.

When the system is running, forces arise at the helical running teeth of the ring gears 18, 20 which act tangentially, radially and transversely (i.e. parallel to the axis of rotation of the ring gears).

Slight angular mis-alignment between the rotational axis of the member 10 and the common rotational axis of the member 16 and the ring gears 18, 20 is accommodated by relative longitudinal sliding of the teeth 14 and the teeth with which they mesh.

FIG. 2 shows transverse forces T arising at the centres 30, 32 of the running teeth 26, 28 of the ring gears 18, 20 which are opposed by reactions T(R) from the helical coupling teeth of the coupling ring 16 which reactions act on the centres 34, 36 of the respective helical coupling teeth 22, 24 of the ring gears 18, 20. The centres 34, 36 of the coupling teeth 22, 24 are offset outwardly from the centres 30, 32 of the respective running teeth 26, 28 so that a twisting couple is exerted on each ring gear 18, 20, producing the distortion shown, which is known as the Inside Out effect.

Figure 3:
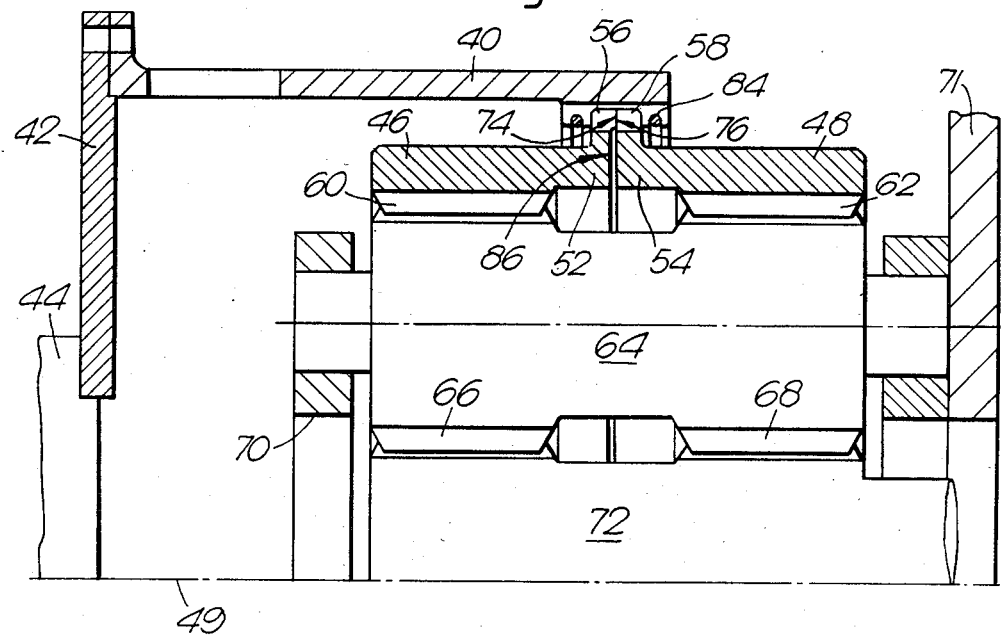
FIG. 3 is a schematic section similar to FIG. 1 showing part of a system according to the invention.

FIG. 3 shows an example of a star-type gear system in which the inner coupling ring 16 shown in FIG. 1 is eliminated.

The system comprises a coupling ring 40 which is connected via the component 42 to a low speed shaft 44 of the system. The ring 40 has internal spur coupling teeth (not shown) which engage external spur coupling teeth 56, 58 on respective extensions 52, 54 of ring gears 46, 48.

The ring gears 46, 48 are mounted adjacent one another on a common axis 49 and have respective arrays of internal helical running teeth 60, 62, the arrays 60, 62 being oppositely handed.

Planet gear wheels 64, each having two arrays of oppositely-handed helical running teeth 66, 68, are mounted on bearings in a carrier 70, within the ring gears 46, 48 and their arrays 66, 68 of teeth mesh with the respective arrays of teeth 60, 62 of the ring gears 46, 48. The carrier is connected to the torque reaction member 71. A sun gear wheel 72 meshes with the planet gear wheels 64 in well-known manner.

The extensions 52, 54 of the ring gears 46, 48 extend towards one another, the arrays of external spur coupling teeth 56, 58 being mutually adjacent to one another. The adjacent side surfaces 74, 76 of the arrays of teeth 56, 58 engage one another.

Figure 4:
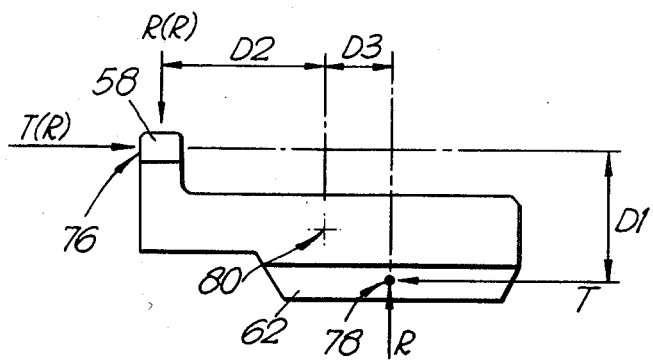
FIG. 4 is a schematic scrap sectional view showing how the Inside Out effect is counteracted by the invention.

FIG. 4 shows one ring gear 48 in more detail. The other ring gear 46 is similar.

The effective centres of the running teeth 62 of the ring gear 48 are at 78. The transverse and radial forces T and R, respectively, are shown acting at a tooth 62.

The side faces 76 of the teeth 58, engaging the side faces 74 of the teeth 56 of the ring gear 46, collectively form an abutment surface means of the ring gear 48, the side faces 74 of the teeth 56 forming an abutment surface means of the ring gear 46.

The transverse forces T at the teeth 58 of the ring gear 48 are opposed by the ring gear 46 producing reactions T(R) acting parallel to the forces T on the abutment surface means 76. The latter are offset radially from the centres 78 by a distance D1 so that a clockwise twisting couple TD1 is exerted on the ring gear 48.

The radial forces R at the teeth 62 are opposed by the coupling ring 40 producing reactions acting on the flanks of the teeth 58.

In reality forces at the coupling teeth are distributed over a number of teeth. For clarity transverse and radial forces are shown acting in the same plane as the forces on the running teeth.

The radial component R(R) of the reaction at coupling teeth 58 is offset axially from the centres 78 of the teeth 62 towards the other ring gear 46 so that an anti-clockwise twisting couple is exerted on the ring gear 48.

Since the twisting couples are in opposite sense the distortion of the ring gear 48 is greatly reduced and in some cases may be eliminated.

The magnitude of the transverse forces T equals the magnitude of the reactions T(R) and that magnitude is the product of the tangential tooth force at the tooth 56 or 58 and the tangent of the helix angle of the tooth.

The radial force R is equal to the product of the tangential tooth force at the tooth 60 or 62 and the tangent of pressure angle for the tooth 60 or 62.

The magnitude of the reaction R(R) is not equal to the magnitude of the force R. It is equal to the product of: (i) the tangential tooth force at the tooth 60 or 62; (ii) the tangent of the pressure angle at the coupling tooth 56 or 58; (iii) the quotient r1 over r2, where r1 is the radius of the running teeth 62 (or 60) to the centres 78 and r2 is the radius of the coupling teeth 58 (or 54) to the effective centres of those teeth.

The anti-clockwise twisting couple has a value R(R)D2+RD3 where D2 and D3 are the distances between the respective lines of action of the reaction R(R) and the radial force R from the centroid 80 of the sectional element of the ring gear represented by the section shown in FIG. 4.

Therefore, although it is possible for the opposed twisting couples to be equal they will not, in general, be equal because the dimensions of the ring gears are primarily determined by other factors altogether.

Angular misalignment between the rotational axis of the member 40 and the common rotational axis of the ring gears 46, 48 is accommodated by relative longitudinal sliding between the spur coupling teeth 56, 58 and the internal spur teeth with which they mesh in the member 40.

In FIGS. 1 and 3 the arrays of coupling teeth 14, 22, 24, 56 and 58 are shown retained between spring retainer rings 84. The rings 84 in the member 10 or 40 in each case can slide generally parallel to the rotational axis of the member 10 or 40 to accommodate articulation between the members 10 and 16 or between the member 40 and the ring gears 46, 48 caused by the angular misalignment referred to above.

One face of the ring gear 46 is relieved at 86 outwardly as far as the roots of the teeth 56 to form a channel means for conducting lubricant to the spaces between the teeth 56, 58 and to the engaged side faces of the teeth 56, 58. The lubricant is that supplied to the interior of the ring gears 46, 48, namely to the running teeth 60, 62 and the planet gear wheel bearings it and is forced by centrifugal effect through the gap between the ring gears 46, 48 to the exterior of the ring gears 46, 48.

In some modifications (not shown) the relieved part does not extend as far as the roots of the teeth or there is no relieving in which cases radial grooves or other channel means are provided to convey lubricant across the face of the ring gear to the tooth spaces and, if necessary, to convey lubricant to the engaged side surfaces of the ring gears. In some cases there is no engagement between the side surfaces of the teeth but only between side surfaces elsewhere on the ring gears.

Both ring gears can be relieved at their opposed faces if required and if required the ring gears can be exactly similar, though of mirror image form.

In another modification (not shown) the coupling teeth are not centrally positioned with respect to the overall axial length of the two combined ring gears but instead the coupling teeth 56 and 58 are, in that case, offset from the centre of the combination of gear rings 46 and 48.

In some applications (not shown), the ring gears can have different axial lengths, in which instances the offsets of the arrays of coupling teeth from the centres of the respective ring gears need not be equal.

In another modification (not shown) the opposed abutment surface means on the ring gears engage intermediate ring means between the ring gears instead of directly engaging each other, channel means for conveying lubricant from the interior to the exterior of the ring gears and, if necessary, to all the engaging surfaces.

The invention described above is applicable to epicyclic gear systems whether of planetary-, star-, solar- or differential-type and to other toothed gear systems of similar or analogous types.

In the system described above with reference to the drawings, the Inside Out effect is counteracted in only one sense of torque transmission through the system.

In other modification (not shown) the member 40 is connected to another member of the system by coupling teeth instead of by bolts.

What I claim is:

1. A toothed gear system comprising:
   (a) gear wheels each having two oppositely-handed arrays of external helical teeth;
   (b) two ring gears of equal diameter mounted adjacent to one another on a common axis; and
   (c) an annular coupling member concentric with said ring gears and having internal spur coupling teeth;
   (d) each said ring gear having an array of internal helical running teeth meshing with a respective one of said arrays of teeth on said gear wheels and having an array of external spur coupling teeth meshing with said coupling teeth of said coupling member, said arrays of coupling teeth of each said ring gear being offset from the centers of said running teeth of the respective ring gear towards said array of coupling teeth on the other ring gear;

(e) said ring gears having mutually opposed lubricated abutment surface means whereby respective transverse forces arising effectively at said centers and acting parallel to said common axis are countered by oppositely acting respective reactions exerted by said ring gears mutually one upon the other; and (f) channel means for lubricant interconnecting the interior of said ring gears with the exterior of said ring gears.

2. A system according to claim 1, in which side faces of the coupling teeth of the ring gears collectively form the respective abutment surface means.

3. A system according to claim 2, in which at least one of the mutually opposed side faces of said ring gears is relieved outwardly to the roots of the respective array of coupling teeth to form said channel means with the other of said side faces, said channel means opening into the spaces between adjacent teeth of said array of coupling teeth.

4. A system according to claim 1, in which said arrays of coupling teeth on said ring gears are equally offset towards one another from said centers of said running teeth on said ring gears.

5. A system according to claim 1 or claim 2, in which the abutment surface means directly engage one another.

6. A system according to claim 1 wherein said channel means for lubricant comprises an annular relief on the side of at least one of said ring gears towards the other of said ring gears extending radially outwardly from the bore of said one ring gear.

7. A system according to claim 6 wherein said channel means extends to the roots of the external spur coupling teeth of the respective ring gear.

* * * * *